(12) United States Patent
Guillou

(10) Patent No.: US 8,284,236 B2
(45) Date of Patent: Oct. 9, 2012

(54) PREVENTING INTERFERENCE BETWEEN PRIMARY AND SECONDARY CONTENT IN A STEREOSCOPIC DISPLAY

(75) Inventor: Jean-Pierre Guillou, San Francisco, CA (US)

(73) Assignees: Sony Corporation, Tokyo (JP); Sony Electronics Inc., Basking Ridge, NJ (US)

( * ) Notice: Subject to any disclaimer, the term of this patent is extended or adjusted under 35 U.S.C. 154(b) by 550 days.

(21) Appl. No.: 12/589,837

(22) Filed: Oct. 29, 2009

(65) Prior Publication Data

US 2010/0208040 A1 Aug. 19, 2010

Related U.S. Application Data

(60) Provisional application No. 61/153,720, filed on Feb. 19, 2009.

(51) Int. Cl.
*H04N 13/00* (2006.01)
(52) U.S. Cl. .................................. 348/42; 348/51
(58) Field of Classification Search .................. 348/42, 348/51
See application file for complete search history.

(56) References Cited

U.S. PATENT DOCUMENTS

| 2002/0054207 | A1 | 5/2002 | Iizuka et al. | |
|---|---|---|---|---|
| 2002/0126396 | A1* | 9/2002 | Dolgoff | 359/743 |
| 2005/0207486 | A1* | 9/2005 | Lee et al. | 348/42 |
| 2005/0285853 | A1 | 12/2005 | Morita et al. | |
| 2007/0003134 | A1 | 1/2007 | Song et al. | |
| 2008/0232680 | A1* | 9/2008 | Berestov et al. | 382/154 |
| 2009/0142041 | A1* | 6/2009 | Nagasawa et al. | 348/42 |
| 2010/0290697 | A1* | 11/2010 | Benitez et al. | 348/51 |
| 2010/0303442 | A1* | 12/2010 | Newton et al. | 386/241 |
| 2011/0074770 | A1* | 3/2011 | Robinson et al. | 345/419 |
| 2011/0187817 | A1* | 8/2011 | Sasaki et al. | 348/42 |
| 2012/0044249 | A1* | 2/2012 | Mashitani et al. | 345/419 |
| 2012/0062711 | A1* | 3/2012 | Ikeda et al. | 348/51 |

FOREIGN PATENT DOCUMENTS

JP 2007-317050 12/2007

OTHER PUBLICATIONS

"Using Virtual Menus in a Virtual Environment," Richard H. Jacoby and Stephen R. Ellis, Human Factors NASA publication, 1992.
"Multi-Touching 3D Data: Towards Direct Interaction in Stereoscopic Display Environments Coupled with Mobile Devices," Steincke et al., VisCG Uni-Muenster publication, 2008.
"Using Transparent Props for Interaction with the Virtual Table," Schmalstieg et al., Symposium on Interactive 3D Graphics, 1999.

* cited by examiner

*Primary Examiner* — Phuoc Nguyen
(74) *Attorney, Agent, or Firm* — Miller Patent Services; Jerry A. Miller

(57) ABSTRACT

A method of positioning primary and secondary images on a stereoscopic display device involves ascertaining a perceived depth of the primary image and the secondary image; transforming the perceived depth of at least one of the primary and secondary image data by compressing the perceived depth of the at least one of the primary and secondary image data; and transforming at least one of the primary and secondary image data so as to position the perceived secondary image at a position that will be perceived by a viewer to be situated at a depth when viewed on the stereoscopic display such that the secondary image appears to be situated fully between the primary image and the viewer when viewed stereoscopically. This abstract is not to be considered limiting, since other embodiments may deviate from the features described in this abstract.

12 Claims, 5 Drawing Sheets

PREVENTING INTERFERENCE BETWEEN PRIMARY AND SECONDARY CONTENT IN A STEREOSCOPIC DISPLAY

CROSS REFERENCE TO RELATED DOCUMENTS

This application is related to and claims priority benefit of U.S. Provisional Patent Application 61/153,720 filed Feb. 19, 2009 to Jean-Pierre Guillou which is hereby incorporated herein by reference.

COPYRIGHT AND TRADEMARK NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever. Trademarks are the property of their respective owners.

BACKGROUND

There are a number of known ways for user interfaces (UI's) to interact with visual content on a display such as a television display. For example, the UI may be somewhat transparent to permit the viewer to view that which is beneath the UI, or the UI may be placed in a window or box that covers the screen. Commonly when a UI is present it will have an area of transparency that allows the user to see both the UI and the content. However, the issues surrounding how to deal with a UI when a television display or the like is displaying stereoscopic display has not been explored to any known extent.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which.

DETAILED DESCRIPTION

Figure 1:
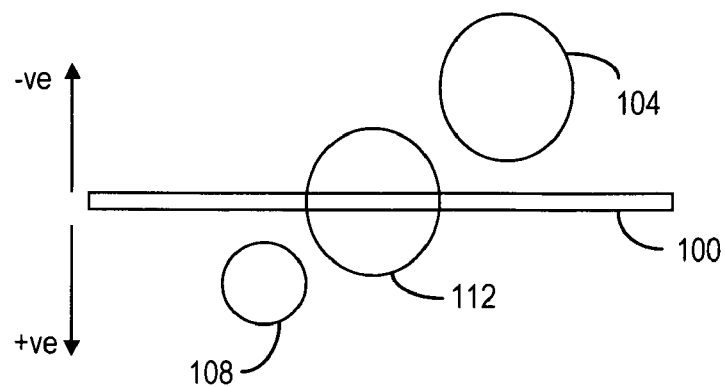
FIG. 1 is a representation of an overhead view of a stereoscopic image as displayed on a stereoscopic display panel in a manner with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/dynamic load library and/or other sequence of instructions designed for execution on a computer system.

The term "program", as used herein, may also be used in a second context (the above definition being for the first context). In the second context, the term is used in the sense of a "television program". In this context, the term is used to mean any coherent sequence of audio video content such as those which would be interpreted as and reported in an electronic program guide (EPG) as a single television program, without regard for whether the content is a movie, sporting event, segment of a multi-part series, news broadcast, etc. The term may also be interpreted to encompass commercial spots and other program-like content which may not be reported as a program in an electronic program guide.

Reference throughout this document to "one embodiment", "certain embodiments", "an embodiment", "an example", "an implementation" or similar terms means that a particular feature, structure, or characteristic described in connection with the embodiment, example or implementation is included in at least one embodiment, example or implementation of the present invention. Thus, the appearances of such phrases or in various places throughout this specification are not necessarily all referring to the same embodiment, example or implementation. Furthermore, the particular features, structures, or characteristics may be combined in any suitable manner in one or more embodiments, examples or implementations without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

As previously noted, the issues surrounding how to deal with a UI when a television display or the like is displaying stereoscopic display has not been explored to any known extent. FIG. 1 depicts a stereoscopic display panel 100 of any suitable design that taken as a view from above. The illustration shows that by using stereoscopy technology, an illusion can be created wherein one can appear to see objects that are either situated behind the plane of the screen 100 with varying depths −ve such as object 104, or may appear to see objects such as 108 that are situated in front of the screen with varying depths +ve, or may straddle the plane of screen 100 such as object 112 so as to appear to have a depth that spans a distance from somewhere on the −ve scale to somewhere on the +ve scale. In the scale depicted, −ve represents the space behind the plane of screen 100 relative to the viewer's position and +ve represents the space in front of the screen 100 relative to the viewer's position.

In order to solve the problem identified above, the UI is placed on a depth plane that does not interfere with the content. To realize this there should be knowledge of the depth of objects in the content. There are at least two methods to acquire this depth information, as will be discussed later.

Figure 2:
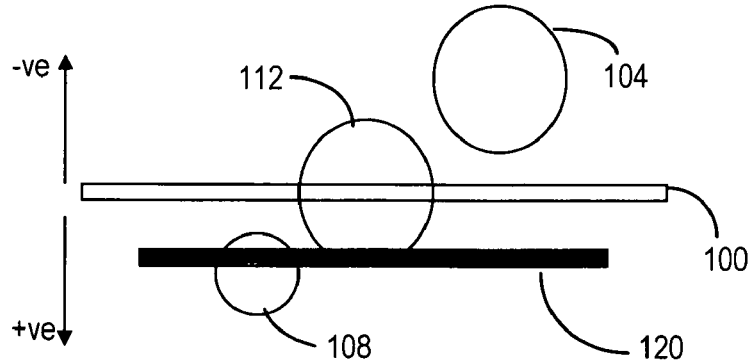
FIG. 2 is a representation of an overhead view of a stereoscopic primary image as displayed on a stereoscopic display panel with a two dimensional secondary image.

In view of the three dimensional illusion created by the stereoscopic display, when one interposes a user interface into the displayed image, there can be a problem with the user having a comfortable interaction of UI and content on the stereoscopic display. Referring to FIG. 2, now consider what happens if a two dimensional UI image 120 is juxtaposed into the three dimensional image at the point indicated. In this case, the depth of objects 108 and 112 may either overlay or underlay or cross the boundary of the two dimensional UI 120's apparent location in the image. This could result in a user's inability to properly utilize the UI, the UI being partially or fully obscured or other inconvenient or uncomfortable interaction between the two dimensional and three dimensional images and user dissatisfaction.

Figure 3:
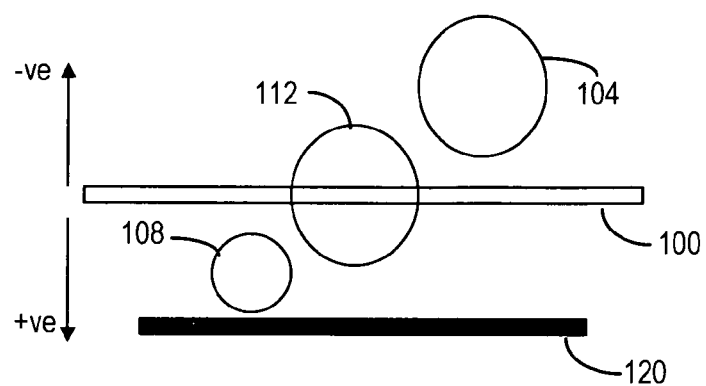
FIG. 3 is a representation of an overhead view of a primary stereoscopic image as displayed on a stereoscopic display panel with a two dimensional secondary image placed closer to the viewer than the primary image in a manner consistent with certain embodiments of the present invention.

In accord with embodiments generally consistent with implementations of the present invention, the problem can be resolved by assuring that, as depicted in FIG. 3, at all times the input images are transformed into images wherein the UI 120 is situated at a position within the apparent three dimensional depth of the displayed image which is closer to the viewer (has a greater value of +ve) than any portion of the three dimensional image. This can be accomplished in a number of ways. As depicted in FIG. 3, the plane of the UI 120 is juxtaposed at a position which is closer than the images in the three dimensional image, without altering the three dimensional image. However, this may not always be possible or comfortable for the viewer.

Figure 4:
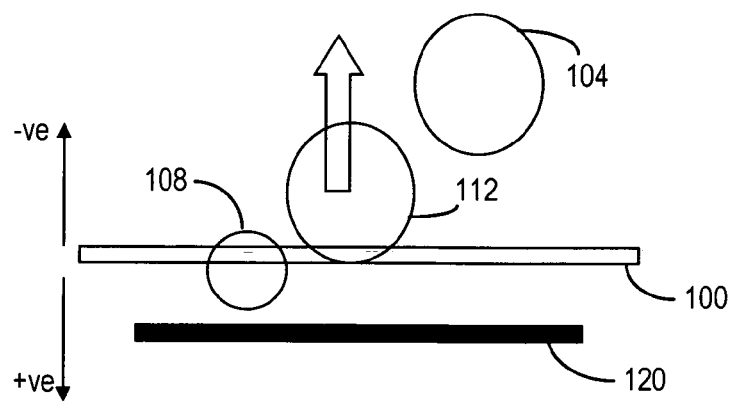
FIG. 4 is a representation of an overhead view of a primary stereoscopic image as displayed on a stereoscopic display panel with a two dimensional secondary image placed closer to the viewer than the primary image, with the primary image scaled away from the viewer in a manner consistent with certain embodiments of the present invention.

As depicted in FIG. 4, one solution to this problem is to place the plane of the two dimensional UI at a depth position that is comfortable for general viewing by the viewer, while moving the relative positions of the three dimensional objects further backward (more negative −ve) in the direction of the arrow. As a part of this process, the span from closest object to farthest object from the viewer may be retained or compressed/scaled as desired so as to transform the images into images that can be positioned as described. In one implementation, the scaling can be carried out by leaving the rearmost position intact and proportionally moving the image elements in front of the rearmost portion backward. In this case, the foremost position is placed far enough back to permit insertion of the secondary image (UI) in front, and the relative position of intermediate objects is scaled proportionally. However, other scaling and compressing methods will occur to those skilled in the art upon consideration of the present teachings.

Figure 5:
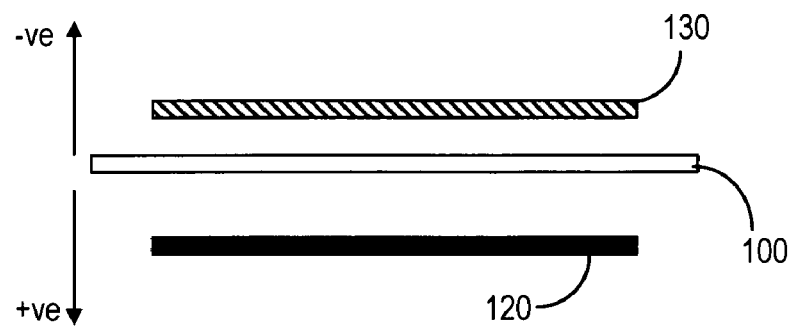
FIG. 5 is a representation of an overhead view of a two dimensional primary image as displayed on a stereoscopic display panel with a two dimensional secondary image placed closer to the viewer than the primary image in a manner consistent with certain embodiments of the present invention.

This process can also be extended to usage on a two dimensional image displayed on a stereoscopic display along with a two dimensional UI as depicted in FIG. 5. In this case, as in the case of three dimensional content, the relative position of the two dimensional UI 120 can be placed at a position in the three dimensional illusion which is closer to the user than a two dimensional image 130. While this depiction shows the two dimensional image 130 being in −ve depth and the UI being in the +ve depth, this is only to be considered illustrative. This only consideration is that the UI be placed closer to the viewer in the illusion than the video image.

Figure 6:
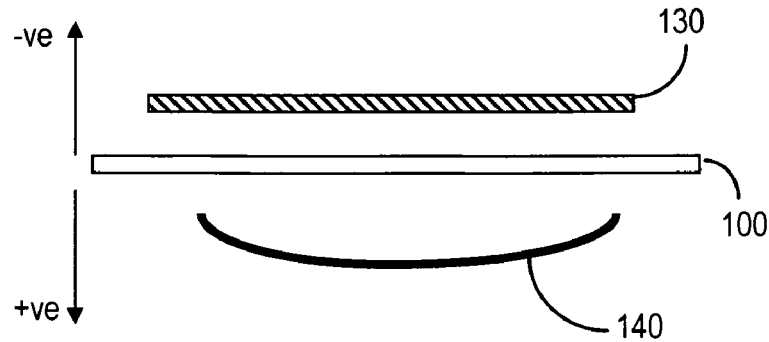
FIG. 6 is a representation of an overhead view of a two dimensional primary image as displayed on a stereoscopic display panel with a three dimensional secondary image placed closer to the viewer than the primary image in a manner consistent with certain embodiments of the present invention.

As a further example, it is possible for the UI to be represented as a three dimensional object as shown in FIG. 6 as UI 140 which has varying depth and which is positioned in front of the two dimensional image 130 displayed on the stereoscopic display panel 100. It will be evident that one can also place a three dimensional UI such as 140 in front of a three dimensional image such as the image containing 104, 108 and 112.

To realize this solution, there should be knowledge of the depth of objects in the content. There are at least two methods to acquire this depth information, but any suitable method is satisfactory for purposes of implementation of embodiments consistent with the present invention.

In accord with a first method, the depth information can be embedded as metadata with the data representing the three dimensional content. In this case, the display system has merely to read the metadata (which can be a global range of depth, or may be on a scene by scene, segment by segment, or frame by frame basis) and select a depth value that is closer to the viewer than the closest object for positioning the UI.

In accord with a second method, a system is in place, which uses either a hardware or software based system, that analyzes the depth of the content, either in real time as the content is played or as an offline process to determine the depth of the content.

In this manner, secondary content such as UI information can be placed such that its depth plane does not interfere with the front most depth plane of the primary content. As noted above, the primary content can be 2D or stereoscopic and the secondary content (e.g., a UI) can also be either 2D or stereoscopic. The primary and secondary content can be video, still images or user interface (UI) without limitation.

Such placement of the relative depth of content or UIs on a stereoscopic display can thus be accomplished in such a way that there is no depth plane interference between the various sources of content. With the above noted embodiments, the use of depth meta-data or calculated depth information is used to make decisions regarding the relative depth placement of content or UIs on a stereoscopic display and to make determinations as to the need for compression of the depth of the primary content. In a transition (on/off or selection) the change in depth can be a dynamic change.

It is also contemplated that In each case the UI could be replaced with a picture-in-picture (PIP) image for multiple source views. It is also possible to modify the depth characteristics of stereoscopic content to allow the content to be moved backwards in depth allowing safe placement of other content in front of it, as noted above.

Figure 7:
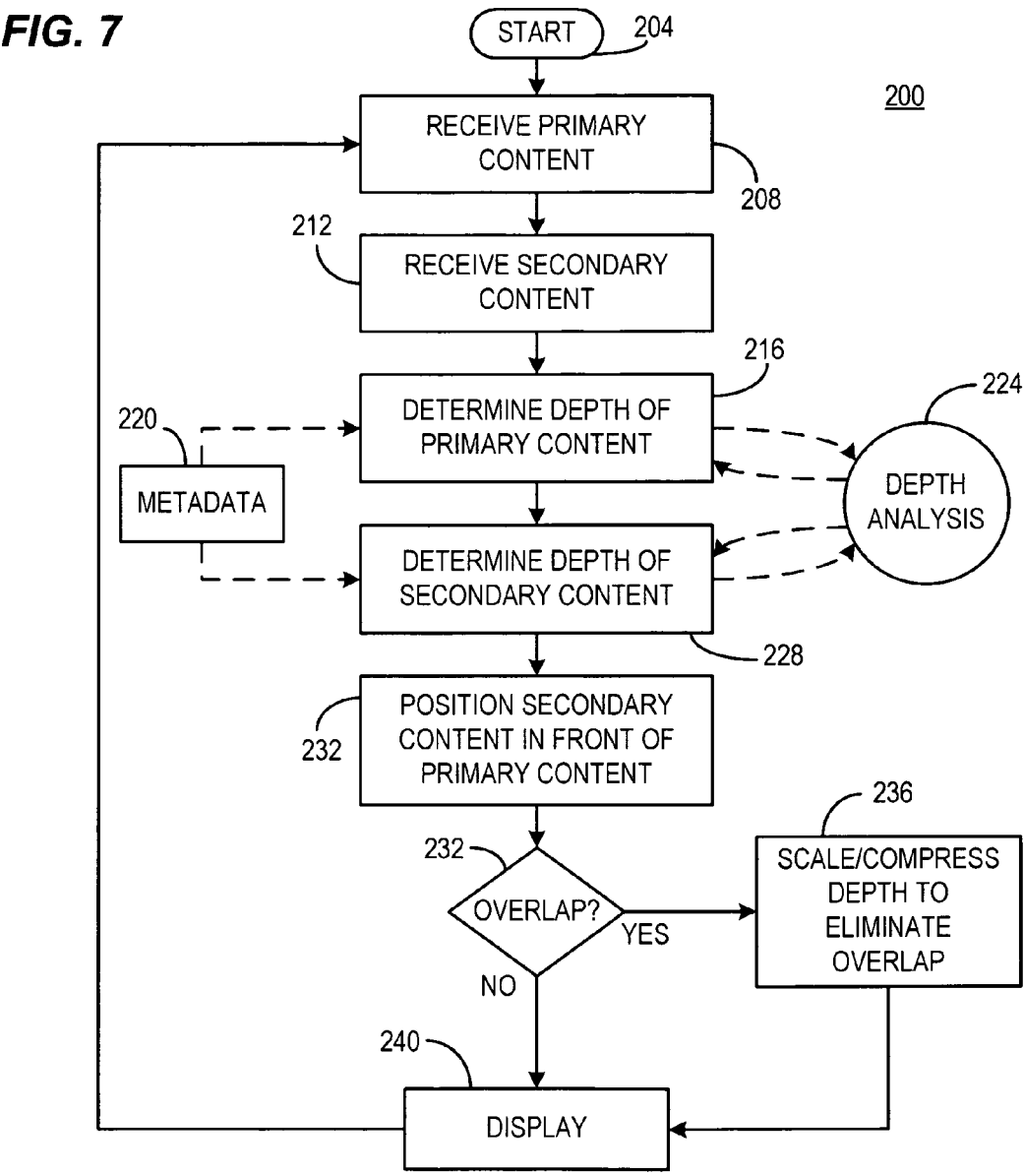
FIG. 7 is a flow chart of an example implementation of a process consistent with certain embodiments of the present invention.

Referring now to FIG. 7, a process 200 is depicted which contemplates either of the two implementations described above or both starting at 204. At 208 and 212, the primary and secondary content are received respectively. This could be an advance receipt of the content or a continuous and substantially parallel flow. In the case of the UI, the secondary content is generated at the display device or an associated piece of hardware (e.g., a personal video recorder (PVR), A/V receiver, disc player, etc.). In any case, at 216, a determination is made as to the depth characteristics of the primary content. If the primary content is two dimensional, the determination may be near trivial, but otherwise, the depth of the primary content can be made either by a process of simply reading metadata associated with the primary content at 220, or by carrying out an analysis of the primary content to determine its depth at 224.

The depth of any content in a stereoscopic display can be ascertained by an analysis of the features of the images of the display. Images used for creation of the stereoscopic illusion are placed on the display in such a manner so that right eye and left eye images are similar but separated by a space which correlates to the depth. Colors or polarization of the images is used to maintain distinction between the left and right eye images, with corresponding colors or polarization used with viewing glasses so as to keep the images separated at the eyes of the viewer. The depth analysis is thus similar to that which would be used in creation of the three dimensional images to place those images on the display. When images are places in relative positions on the screen, but with opposite polarization or color filtering, this can be detected and the reverse calculation carried out to find the foremost image in the primary content.

In a similar manner, the depth of the secondary content may be determined (if not trivial or generated at the display so that the depth can be known or controlled) at 228. At this point, the relative depths of the primary and secondary content are known, and the display simply shifts the secondary content to a position that is believed to be in front of the primary content. However, in the event there is still an overlap due to excess depth of either primary content, secondary content or both, or if the secondary content would have to be placed at a depth that would be considered uncomfortable for viewing or comfortable use at 232, then, either the primary or secondary content or both can be scaled in depth so that the transformed images can be positioned so as to eliminate the overlap at 236. Once there is no overlap in the content, either at 232 or 236, the content is presented for display on the display at 240 and the process cycles back as new content is received to 208.

Figure 8:
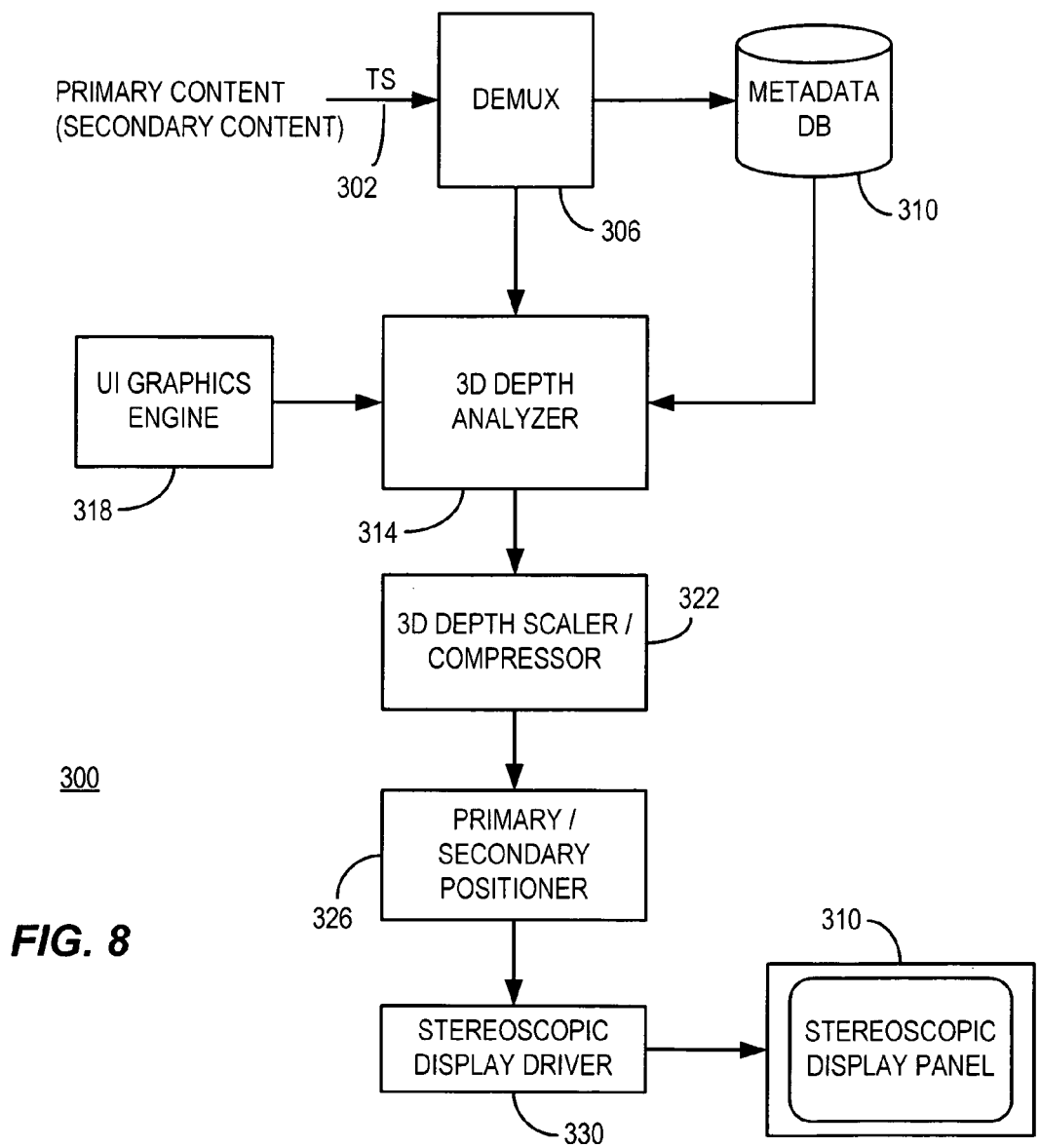
FIG. 8 is an example of a block diagram of an example implementation consistent with certain embodiments of the present invention.

Referring now to FIG. 8, a simplified functional block diagram of a system 300 for accomplishing the processes described previously is depicted. In this system, a transport stream 302 received from a cable, satellite, telco, video disc or other source or sources is shown as 302 and is provided to a demultiplexer 306 that sorts out the content according to the viewer's tuning commands. The content received via 302 can include only primary content, or may include secondary content, either of which can be rendered using the stereoscopic display panel. As previously noted, the content (primary and/or secondary) may contain metadata that define the depth information for the content. If so, this metadata are stored in a metadata database 310. The primary content (and if present, the secondary content) is sent to a 3D depth analyzer 314 which either carries out an analysis to determine the depth information or ascertains the information from the metadata stored in the database 310. If the secondary content is UI information, the UI information is received at the depth analyzer 314 from a UI graphics engine 318 (possibly including depth information if the UI is represented as three dimensional). The 3D depth analyzer determines the relative depth of the images and passes the images and associated depth to a 3D depth scaler/compressor 322 where, if necessary to avoid overlap of the images, one or the other or both of the primary and secondary images can be compressed or scaled to occupy less perceived depth in order to transform the image representations into images that can be positioned as described. The images are then passed to the primary/secondary positioner (image positioner) 326 where the relative locations of the image are transformed so that the secondary image is positioned in front of the primary image (between the primary image and the viewer) in perceived depth of the 3D image. This combined image can then be passed to the display drivers 330 for display on stereoscopic display 310.

The functional blocks shown in 300 are intended to represent processes that can be carried out either as hardware functions or as software functions running on one or more programmed processors to transform the primary and secondary images into images that do not interfere with one another such that the secondary image is always disposed in perceived depth to be between the primary image and the viewer. The various functions described can be carried out in the arrangement shown, or can be rearranged with various functions combined in any manner that produces this desired output without limitation.

In addition to the above, it is noted that a viewer obtains clues to the depth of an object when viewed in three dimensions in addition to those obtained by stereoscopic cues. Hence, in addition to use of stereoscopical placement of an object in front of another object in order to achieve the desired results discussed above, other non-stereoscopic visual clues can be used to modify a front or rear image to assure that objects in front are or objects of most importance (e.g., menu selections from a GUI) are emphasized. Such clues include, but are not limited to: desaturation of the rear image; defocusing the rear image; and reducing the brightness of the rear image. The opposite effects could be added to the front image to enhance its prominence. Other such visual clues will be evident to those skilled in the art upon consideration of the present teachings.

Thus, a method of positioning primary and secondary images on a stereoscopic display device involves receiving primary and secondary image data representing primary and secondary images for simultaneous display on a stereoscopic display panel, wherein at least one of the primary and secondary image data represents three dimensional stereoscopic image data; ascertaining a perceived depth of the primary image; ascertaining a perceived depth of the secondary image; where ascertaining the perceived depth of at least one of the primary image and the secondary image is carried out by either reading metadata associated with at least one of the primary and secondary image, or by carrying out a depth analysis of the at least one of the primary image and secondary image data; transforming the perceived depth of at least one of the primary and secondary image data by compressing the perceived depth of the at least one of the primary and secondary image data; and transforming at least one of the primary and secondary image data so as to position the perceived secondary image at a position that will be perceived by a viewer to be situated at a depth when viewed on the stereoscopic display such that the secondary image appears to be situated fully between the primary image and the viewer when viewed stereoscopically.

In certain implementations, the secondary image comprises user interface graphics. In certain implementations, the method further involves transforming the primary image data to a position that renders the perceived image of the primary image to be further away from a viewer position. In certain implementations, the method further involves transforming the secondary image data to a position that renders the perceived image of the secondary image to be closer to a viewer position. In certain implementations, the method further involves applying a non-stereoscopic visual modification to one of the primary and secondary image. In certain implementations, the non-stereoscopic visual modification comprises at least one of defocusing, desaturating and reducing the brightness of one of the primary and secondary images.

Another method of positioning primary and secondary images on a stereoscopic display device involves receiving primary and secondary image data representing primary and secondary images for simultaneous display on a stereoscopic display panel; ascertaining a perceived depth of the primary image; ascertaining a perceived depth of the secondary image; and transforming at least one of the primary and secondary image data so as to position the perceived secondary image at a position that will be perceived by a viewer to be situated at a depth when viewed on the stereoscopic display such that the secondary image appears to be situated fully between the primary image and the viewer when viewed stereoscopically.

In certain implementations, at least one of the primary and secondary image data represents three dimensional stereoscopic image data. In certain implementations, ascertaining the perceived depth of at least one of the primary image and the secondary image is carried out by reading metadata associated with at least one of the primary and secondary image. In certain implementations, ascertaining the perceived depth of at least one of the primary image and the secondary image is carried out by carrying out a depth analysis of the at least one of the primary image and secondary image data. In certain implementations, the secondary image comprises user interface graphics. In certain implementations, the method further involves transforming the perceived depth of at least one of the primary and secondary image data by compressing the perceived depth of the at least one of the primary and secondary image data. In certain implementations, the method further involves transforming the primary image data to a position that renders the perceived image of the primary image to be further away from a viewer position. In certain implementations, the method further involves transforming the secondary image data to a position that renders the perceived image of the secondary image to be closer to a viewer position. In certain implementations, the method further involves applying a non-stereoscopic visual modification to one of the primary and secondary. In certain implementations, the non-stereoscopic visual modification comprises at least one of defocusing, desaturating and reducing the brightness of one of the primary and secondary images.

Any of the above-described methods can be implemented using a computer readable electronic storage medium storing instructions which, when executed on one or more programmed processors, carry out such method.

A system for positioning primary and secondary images on a stereoscopic display device has a demultiplexer primary and secondary image data representing primary and secondary images for simultaneous display on a stereoscopic display panel, wherein at least one of the primary and secondary image data represents three dimensional stereoscopic image data. A 3D depth analyzer ascertains a perceived depth of the primary image and ascertains a perceived depth of the secondary image, where ascertaining the perceived depth of at least one of the primary image and the secondary image is carried out by either reading metadata associated with at least one of the primary and secondary image from a metadata database, or by carrying out a depth analysis of the at least one of the primary image and secondary image data. A 3D depth scaler transforms the perceived depth of at least one of the primary and secondary image data by compressing the perceived depth of the at least one of the primary and secondary image data. An image positioner transforms at least one of the primary and secondary image data so as to position the perceived secondary image at a position that will be perceived by a viewer to be situated at a depth when viewed on the stereoscopic display such that the secondary image appears to be situated fully between the primary image and the viewer when viewed stereoscopically.

In certain implementations, the secondary image comprises user interface graphics. In certain implementations, the image positioner further transforms the primary image data to a position that renders the perceived image of the primary image to be further away from a viewer position. In certain implementations, the image positioner further transforms the secondary image data to a position that renders the perceived image of the secondary image to be closer to a viewer position. In certain implementations, a non-stereoscopic visual modification is applied to the primary image to visually deemphasize the primary image. In certain implementations, the non-stereoscopic visual modification comprises at least one of defocusing, desaturating and reducing the brightness of the primary image.

A system for of positioning primary and secondary images on a stereoscopic display device has a demultiplexer that receives primary and secondary image data representing primary and secondary images for simultaneous display on a stereoscopic display panel. A 3D depth analyzer ascertains a perceived depth of the primary image and ascertains a perceived depth of the secondary image. An image positioner transforms at least one of the primary and secondary image data so as to position the perceived secondary image at a position that will be perceived by a viewer to be situated at a depth when viewed on the stereoscopic display such that the secondary image appears to be situated fully between the primary image and the viewer when viewed stereoscopically.

In certain implementations, at least one of the primary and secondary image data represents three dimensional stereoscopic image data. In certain implementations, the 3D depth analyzer ascertains the perceived depth of at least one of the primary image and the secondary image by reading metadata associated with at least one of the primary and secondary image. In certain implementations, the 3D depth analyzer ascertains the perceived depth of at least one of the primary image and the secondary image by carrying out a depth analysis of the at least one of the primary image and secondary image data. In certain implementations, the secondary image comprises user interface graphics. In certain implementations, a 3D depth scaler transforms the perceived depth of at least one of the primary and secondary image data by compressing the perceived depth of the at least one of the primary and secondary image data. In certain implementations, the image positioner transforms the primary image data to a position that renders the perceived image of the primary image to be further away from a viewer position. In certain implementations, the image positioner further transforms the secondary image data to a position that renders the perceived image of the secondary image to be closer to a viewer position In certain implementations, a non-stereoscopic visual modification to the primary image. In certain implementations, the non-stereoscopic visual modification comprises at least one of defocusing, desaturating and reducing the brightness of the primary image.

Those skilled in the art will recognize, upon consideration of the above teachings, that certain of the above exemplary embodiments may be based upon use of a programmed processor. However, the invention is not limited to such exemplary embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

Certain embodiments described herein, are or may be implemented using a programmed processor executing programming instructions that are broadly described above in flow chart form that can be stored on any suitable electronic or computer readable storage medium. However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

While certain illustrative embodiments have been described, it is evident that many alternatives, modifications, permutations and variations will become apparent to those skilled in the art in light of the foregoing description.

What is claimed is:

1. A method of positioning primary and secondary images on a stereoscopic display device, comprising:
    receiving primary and secondary image data representing primary and secondary images for simultaneous display on a stereoscopic display panel, wherein at least one of the primary and secondary image data represents three dimensional stereoscopic image data;
    ascertaining a perceived depth of the primary image;
    ascertaining a perceived depth of the secondary image;
    where ascertaining the perceived depth of at least one of the primary image and the secondary image is carried out by either reading metadata associated with at least one of the primary and secondary image, or by carrying out a depth analysis of the at least one of the primary image and secondary image data;
    transforming the perceived depth of at least one of the primary and secondary image data by compressing the perceived depth of the at least one of the primary and secondary image data; and
    transforming at least one of the primary and secondary image data so as to position the perceived secondary image at a position that will be perceived by a viewer to be situated at a depth when viewed on the stereoscopic display such that the secondary image appears to be situated fully between the primary image and the viewer when viewed stereoscopically.

2. The method according to claim 1, wherein the secondary image comprises user interface graphics.

3. The method according to claim 1, further comprising transforming the primary image data to a position that renders the perceived image of the primary image to be further away from a viewer position.

4. The method according to claim 1, further comprising transforming the secondary image data to a position that renders the perceived image of the secondary image to be closer to a viewer position.

5. The method according to claim 1, further comprising applying a non-stereoscopic visual modification to one of the primary and secondary image.

6. The method according to claim 5, wherein the non-stereoscopic visual modification comprises at least one of defocusing, desaturating and reducing the brightness of one of the primary and secondary images.

7. A system for positioning primary and secondary images on a stereoscopic display device, comprising:
    a demultiplexer primary and secondary image data representing primary and secondary images for simultaneous display on a stereoscopic display panel, wherein at least one of the primary and secondary image data represents three dimensional stereoscopic image data;
    a 3D depth analyzer that ascertains a perceived depth of the primary image and ascertains a perceived depth of the secondary image, where ascertaining the perceived depth of at least one of the primary image and the secondary image is carried out by either reading metadata associated with at least one of the primary and secondary image from a metadata database, or by carrying out a depth analysis of the at least one of the primary image and secondary image data;
    a 3D depth scaler that transforms the perceived depth of at least one of the primary and secondary image data by compressing the perceived depth of the at least one of the primary and secondary image data; and
    an image positioner that transforms at least one of the primary and secondary image data so as to position the perceived secondary image at a position that will be perceived by a viewer to be situated at a depth when viewed on the stereoscopic display such that the secondary image appears to be situated fully between the primary image and the viewer when viewed stereoscopically.

8. The system according to claim 7, wherein the secondary image comprises user interface graphics.

9. The system according to claim 7, wherein the image positioner further transforms the primary image data to a position that renders the perceived image of the primary image to be further away from a viewer position.

10. The system according to claim 7, where the image positioner further transforms the secondary image data to a position that renders the perceived image of the secondary image to be closer to a viewer position.

11. The system according to claim 7, wherein a non-stereoscopic visual modification is applied to the primary image to visually deemphasize the primary image.

12. The system according to claim 11, wherein the non-stereoscopic visual modification comprises at least one of defocusing, desaturating and reducing the brightness of the primary image.

* * * * *